United States Patent [19]

Mizoule

[11] Patent Number: 5,395,873
[45] Date of Patent: Mar. 7, 1995

[54] TOY PASTE BASED IN POLYVINYL ALCOHOL

[76] Inventor: Henri Mizoule, 3 avenue de Porchefontaine, 78000 Versailles, France

[21] Appl. No.: 169,766

[22] Filed: Dec. 20, 1993

Related U.S. Application Data

[63] Continuation of Ser. No. 846,077, Mar. 5, 1992, abandoned.

[30] Foreign Application Priority Data

Mar. 8, 1991 [FR] France ................................. 91 02811

[51] Int. Cl.$^6$ ............................ C08K 3/00; C08K 5/00
[52] U.S. Cl. .................................... 524/388; 524/405; 524/503; 524/557
[58] Field of Search ................. 524/388, 405, 503, 557

[56] References Cited

U.S. PATENT DOCUMENTS

| | | | |
|---|---|---|---|
| 3,061,572 | 10/1962 | Packer | 524/563 |
| 4,094,694 | 6/1978 | Long | 524/405 X |
| 4,131,581 | 12/1978 | Coker | 524/388 X |
| 4,956,404 | 9/1990 | Pelzig | 524/48 |
| 5,006,586 | 4/1991 | Touji et al. | 524/388 X |

FOREIGN PATENT DOCUMENTS

| | | | |
|---|---|---|---|
| 2935019 | 3/1981 | Germany . | |
| 0027905 | 8/1973 | Japan | 524/405 |
| 0041748 | 4/1976 | Japan | 524/405 |
| 51-125446 | 11/1976 | Japan . | |
| 0047034 | 4/1977 | Japan | 524/405 |
| 0154411 | 12/1979 | Japan | 524/405 |
| 55-052086 | 4/1980 | Japan . | |
| 0034148 | 2/1982 | Japan | 524/405 |
| 0059940 | 4/1982 | Japan | 524/405 |
| 59-036278 | 2/1984 | Japan . | |
| 2172060 | 7/1987 | Japan | 524/405 |
| 3072544 | 4/1988 | Japan | 524/405 |

*Primary Examiner*—Judy M. Reddick
*Attorney, Agent, or Firm*—Jacobson, Price, Holman & Stern

[57] ABSTRACT

The present invention relates to a composition for paste, designed, in particular, to be used as a toy paste, which is obtained by immobilization of an aqueous solution of polyvinyl alcohol with a borax.

6 Claims, No Drawings

TOY PASTE BASED IN POLYVINYL ALCOHOL

This application is a continuation of application Ser. No. 07/846,077, filed Mar. 5, 1992, now abandoned.

The present invention relates to a paste which, being in the nature of a plaything, is intended most especially for children.

Toy pastes of the "modeling paste" type, which are essentially designed to be made into a particular shape by the child in order to represent people and/or objects, are already known; these pastes are made from products of mineral origin, for example, clays or products derived from clay, or alternatively from products of vegetable origin of the crosslinked starch type.

These modeling pastes are, in general, non-elastic and are not capable of being stretched, at least over a very great length.

Silicone-based pastes, which are essentially designed to be stretched and then to be rolled into a ball in order to recover some degree of elasticity which enables them to bounce, are also known. Nevertheless, these silicone pastes have, in the first place, a feel which is not very pleasant and, moreover, their potential for being stretched is rather limited.

The subject of the present invention is a paste which simultaneously possesses a very great flexibility which enables it to bounce, which is very ductile but which, however, can prove brittle if pulled sharply.

The paste according to the present invention is capable of stretching to altogether unexpected lengths; thus, from a ball of 40 g of paste, it is possible to produce from 15 to 20 m of thread. This paste stretches under its own weight and is elastic; when rolled into a sphere, it bounces like a ball. It is very pleasant to touch and has absolutely no tendency to stick to the hands.

A rather surprising property of this product is that, when it is held in the hand, a pleasant feeling of coolness is obtained.

More especially, the present invention hence relates to a composition for paste, designed, in particular, to be used as a toy paste, which is obtained by immobilization of an aqueous solution of a polyvinyl alcohol with a borax, and wherein the borax is used in a weight ratio relative to the polyvinyl alcohol of 1:5 to 1:10.

Preferably, the ratio is in the region of 1:6.

This aqueous solution of polyvinyl alcohol may be crosslinked with borax, that is to say sodium borate, or with equivalent compounds hereinafter designated borax, a specific meaning not being stated, and which have the capacity for crosslinking polyvinyl alcohol (PVA).

Polyvinyl alcohol exists in many grades, depending on the degree of polymerization; the borax content should hence clearly be suited to the PVA used.

The composition according to the present invention contains, in addition, a plasticizer which can be glycerol.

The paste according to the invention is preferably obtained, as will become apparent from the example below, using hot water, preferably boiling water.

In order to impart a nonstick character to it, an oil is added to this paste, for example a liquid paraffin, and in order to complement its character as a plaything, it is possible to add perfumes, colorings, preservatives such as methyl 4-hydroxybenzoate or related products to it. It is also possible to add mother-of-pearl to it so as to give it an especially attractive appearance.

The paste thereby obtained is altogether unusual in character. In effect, this paste, which can bounce like a ball when in bulk form, is capable of stretching very readily and even of flowing. Thus, this paste is capable of taking on the shape of the vessel which contains it, but also of taking on the shape of an article on which it is placed. This makes it possible to cover or decorate any sort of figurine, animals, various articles, to color them or to transform them. When the paste is placed on an article, it flows slowly and coats said article with a fine plastic layer, meticulously assuming all the shapes of the article; then, after a few hours, the paste dries and the article has become plasticized.

It is possible, with different sets of pastes, to make combinations of colors and, if desired, vary the shapes.

The article, once plasticized, can be returned to its initial state; to do this, it suffices to plunge it into water for a few minutes, when the paste softens by absorption of water and detaches readily. The examples which follow are designed more especially to demonstrate a process for preparing a paste according to the present invention.

EXAMPLE 1

The different ingredients of the paste are brought into contact in the order described below, and the whole of the process is performed at boiling water temperature.

The proportions, which play a large part in obtaining the result, fall, in general, within a water/polyvinyl alcohol weight ratio of between 5:1 and 2:1, and preferably a ratio of the order of 3.5:1; the borax/polyvinyl alcohol ratio is, for its part, between 1:5 and 1:10, and preferably in the region of 1:6.

When the quantity of borax is increased, the crosslinking of the system increases and the paste tends to become less ductile.

The following ingredients are mixed in the proportions indicated and in the order indicated by the formulation:

| - | Boiling water | 1,500 g |
| --- | --- | --- |
| 1 | Methyl 4-hydroxybenzoate | 5 g |
| 2 | Polyvinyl alcohol | 430 g |
| 3 | Glycerol | 100 g |
| 4 | Liquid paraffin | 50 g |
| 5 | Coloring solution | 10 g |
| 6 | Perfume extract solution | 2 g |
| 7 | Mother-of-pearl | 10 g |
| 8 | Disodium tetraborate | 70 g |

Approximately 2,000 g of a toy paste according to the present invention are thereby obtained after evaporation of the liquid residues.

EXAMPLE 2

A solution A is prepared:
The following products are dissolved in the tank of a mixer containing 60 liters of hot water at between 80° and 90° C.:

| 1/ | Methyl 4-hydroxybenzoate | 300 g |
| --- | --- | --- |
| 2/ | Polyvinyl alcohol | 18 kg |
| 3/ | Glycerol | 6 kg |
| 4/ | Coloring | 10 g |
| 5/ | Perfume extract solution | 50 g |
| 6/ | Mother-of-pearl | 600 g |

The mixture is stirred until dissolution is complete (approximately 1 hour).

A second solution B is prepared:

The following are dissolved in a tank containing 15 liters of water at 80°/90° C.:

| 1/ | Methyl 4-hydroxybenzoate | 60 g |
|---|---|---|
| 2/ | Disodium tetraborate | 3 kg |
| 3/ | Liquid paraffin | 3 kg |

To obtain the crosslinking of the paste, the solution B is blended with the solution A, for example by means of a pump whose output is adjusted so as to blend the solution B with the solution A in a time of 3 to 4 minutes. These 3 to 4 minutes represent the time needed for a satisfactory formation of the paste, and contribute to obtaining the correct texture. After the solution B has been completely blended with the solution A, kneading is continued for approximately 5 minutes. After this time, the paste becomes harder and it is no longer possible to knead it, since it forms a compact lump which rotates with the blades of the mixer.

I claim:

1. A non-sticky, elastic paste which stretches under its own weight and bounces like a ball which is obtained by cross-linking in hot water an aqueous solution of a polyvinyl alcohol with a borax, and wherein the borax is used in a weight ratio relative to the polyvinyl alcohol of 1:5 to 1:10 and the weight ratio of water to polyvinyl alcohol is between 5:1 and 2:1, said paste further comprising a plasticizer and an oil.

2. The paste as claimed in claim 1, wherein the plasticizer is glycerol.

3. The paste as claimed in claim 1, which is obtained in boiling water.

4. The paste as claimed in claim 1 wherein the weight ratio of water to polyvinyl alcohol is about 3.5:1.

5. The paste as claimed in claim 1, further comprising at least one member selected from the group consisting of perfumes, colorings and preservatives.

6. A non-sticky, elastic paste which stretches under its own weight and bounces like a ball consisting of water, polyvinyl alcohol, borax, a plasticizer and an oil, said paste being obtained by cross-linking an aqueous solution of polyvinyl alcohol with a borax, the borax being used in a weight ratio relative to the polyvinyl alcohol of 1:5 to 1:10, and the weight ratio of water to polyvinyl alcohol being between 5:1 and 2:1.

* * * * *